(12) United States Patent
Mohtashami

(10) Patent No.: US 9,847,025 B2
(45) Date of Patent: Dec. 19, 2017

(54) METHOD AND APPARATUS FOR BRIDGE HEIGHT MEASUREMENT AND TRUCK HIT ACCIDENT PREVENTION

(71) Applicant: Mory Mostafa Mohtashami, Irvine, CA (US)

(72) Inventor: Mory Mostafa Mohtashami, Irvine, CA (US)

( * ) Notice: Subject to any disclaimer, the term of this patent is extended or adjusted under 35 U.S.C. 154(b) by 320 days.

(21) Appl. No.: 14/736,682

(22) Filed: Jun. 11, 2015

(65) Prior Publication Data

US 2015/0364041 A1   Dec. 17, 2015

Related U.S. Application Data

(60) Provisional application No. 62/012,387, filed on Jun. 15, 2014.

(51) Int. Cl.
| | |
|---|---|
| G08G 1/0967 | (2006.01) |
| G01B 21/16 | (2006.01) |
| G01C 5/00 | (2006.01) |
| G08G 1/095 | (2006.01) |

(52) U.S. Cl.
CPC ......... *G08G 1/096783* (2013.01); *G01C 5/00* (2013.01); *G08G 1/095* (2013.01); *G08G 1/096716* (2013.01); *G08G 1/096758* (2013.01)

(58) Field of Classification Search
CPC .... G01B 21/16; G01C 5/00; G08G 1/096783; G08G 1/095; G08G 1/096716; G08G 1/096758

USPC ........ 702/150, 166, 171, 188; 340/435, 904, 340/905; 348/148; 367/111; 166/28 R; 701/117

See application file for complete search history.

(56) References Cited

U.S. PATENT DOCUMENTS

| | | | |
|---|---|---|---|
| 3,232,265 A | 2/1966 | Hurt | |
| 4,015,232 A | 3/1977 | Sindle | |
| 4,284,971 A | 8/1981 | Lowry | |
| 4,789,941 A | 12/1988 | Nunberg | |
| 4,955,315 A * | 9/1990 | Lee ........................... | G09F 3/00 116/28 R |
| 5,389,912 A | 2/1995 | Arvin | |
| 2013/0222592 A1* | 8/2013 | Gieseke ................... | G08G 1/04 348/148 |
| 2015/0179069 A1* | 6/2015 | Cazanas ........... | G08G 1/096775 340/905 |

FOREIGN PATENT DOCUMENTS

CN       201229406       *   4/2009

* cited by examiner

*Primary Examiner* — John H Le
(74) *Attorney, Agent, or Firm* — Viking IP Law; Scott R. Hansen

(57) ABSTRACT

A method is presented for warning of bridge height clearance with a system that has a measuring device mounted on a bridge, a processor and a display. The method includes measuring the distance from the point at which the measuring device is mounted on the bridge to pavement below to obtain measurement data, processing the measurement data to calculate a clearance height of the bridge, and displaying a clearance height of the bridge on a display so that a driver approaching the bridge can see the current height of the bridge.

13 Claims, 3 Drawing Sheets

METHOD AND APPARATUS FOR BRIDGE HEIGHT MEASUREMENT AND TRUCK HIT ACCIDENT PREVENTION

RELATED APPLICATIONS

This application claims priority from U.S. Provisional Application 62/012,387 entitled "Method and Apparatus for Bridge Height Measurement" tiled Jun. 15, 2014 and which is incorporated herein.

BACKGROUND

There is a problem of trucks travelling on roads and highways hitting overhead obstructions such as bridges. Sometimes the problem occurs when the truck driver incorrectly assumes that an upcoming bridge is higher than the height of the track. This can stem from: a) the driver not knowing the height of the truck; b) the driver not knowing the height of the bridge; and/or c) the posted height of the bridge is out-of-date.

In the first two cases, there is an element of driver error. But in the third case, the reason a bridge height might be out-of-date is that over time, the road may be repaved and the distance between the road and the under surface of the bridge changed, or other factors, such as the bridge settling over time. Or, there may be snow or mud on the pavement, or the air temperature may make the pavement expand or contract, or other factors that change the clearance height between the pavement and the bridge. In this case, there may be a posted clearance height, and the driver may know that the height of the truck is less than the posted clearance. But if the posted clearance is wrong —if, for example, the posted clearance is greater than the actual clearance—the cause of the crash may be attributable to the inaccurate information as to the bridge height.

Various systems tor preventing truck/bridge collisions have been proposed. U.S. Pat. No. 5,389,912 disclosed a vehicle mounted system for detecting the height of a vehicle using ultrasound waves that are focused in front of the vehicle.

U.S. Pat. No. 3,232,265 disclosed a vehicle mounted height clearance indicator which includes a flexible, antenna-like height indicator which physically contacts an overhead object and provides a relatively direct indication of the height of the object by mechanical means. Although this clearance indicator is useful owing to its functioning without an electrical supply, a drawback of this device is that it will wear over time given its direct physical contact with obstructions.

U.S. Pat. No. 4,284,971 disclosed an overheight vehicle detection and warning system which is installed along a roadway to measure the vehicle height as it passes the system, and illuminates a warning sign telling the driver of the truck to stop if the vehicle height is greater than an approaching bridge. There is no meaning other than the warning sign that communicates the height indication to the driver.

U.S. Pat. No. 4,789,941 is concerned with a system which uses a computerized vehicle classification system that calculates the height of the vehicle in order to classify the vehicle for toll collection or traffic control purposes. This system is inapplicable for determining the absolute heights of vehicles, as this system rejects the height of the vertical exhaust pipe of a truck, for example, as an anomalous reading because it is not concerned with the absolute height of vehicles, but rather with the classification of the vehicle.

U.S. Pat. No. 4,015,232 disclosed a vehicle mounted ultrasonic distance defector far vehicles that tells the driver how close portions of the vehicle are to horizontally spaced objects such as the distance from a wall to truck bumper.

There is a gap in practical technology that can post an accurate bridge clearance in real time.

BRIEF SUMMARY OF THE INVENTION

One embodiment of the invention is a method for warning of bridge height clearance with a system that includes a measuring device mounted on a bridge, a processor and a display. The distance from the point at which the measuring device is mounted on the bridge to the roadway below is measured. The measurement data is used to calculate a clearance height of the bridge. The clearance height is then displayed on a display so that a driver approaching the bridge can see the current height of the bridge.

The measurement data may be adjusted when calculating the clearance height to account for special conditions, such as the location on the bridge the device is mounted and protrusions that extend from the bridge. In one approach, the clearance height is displayed on an LED display that is visible to a driver of an approaching vehicle as the vehicle approaches the bridge. The clearance height may be measured and updated continuously, or at pre-selected re-measuring intervals.

In another approach, the display is within a vehicle. The clearance height is transmitted and the display within the vehicle displays the transmitted clearance height. The clearance height may be transmitted over a computer network, for example. There may be a variety of displays. For example, the bridge height data may be available to displays within multiple vehicles, each display displaying the transmitted clearance height of the bridge. These displays might also be adapted to display bridge clearance heights from different bridges.

There may be more than one measuring device mounted on the bridge. To calculate a clearance height, measurement data front multiple measuring devices is processed. As another alternative, the system may include at least two displays, one display visible to traffic approaching the bridge from a first direction and a second display visible to traffic approaching the bridge from a second direction. A first clearance height is displayed to traffic approaching die bridge from the first direction and a second clearance height, which may be different from the first clearance height, is displayed to traffic approaching the bridge from the second direction.

The system may include displays set at a distance from the bridge, that may be along the roadway leading up to the bridge such that the bridge clearance height is visible to oncoming traffic well in advance of the bridge. In another embodiment the bridge clearance height is transmitted to a server. The bridge clearance height may be used to determine a preferred route for a particular vehicle. Clearance heights of one or more other bridges may be used to calculate the preferred route as well.

In another approach, the system includes multiple measuring devices. Measurement data is used to calculate at least one clearance height of the bridge. The clearance height is displayed on an LED display visible to traffic approaching the bridge, and it is also transmitted over a computer network. The clearance height is displayed on a second display located remotely fern the bridge, such as along the roadway leading up to the bridge and/or on a displayed mounted in a vehicle. The method may also

DETAILED DESCRIPTION

Figure 1:
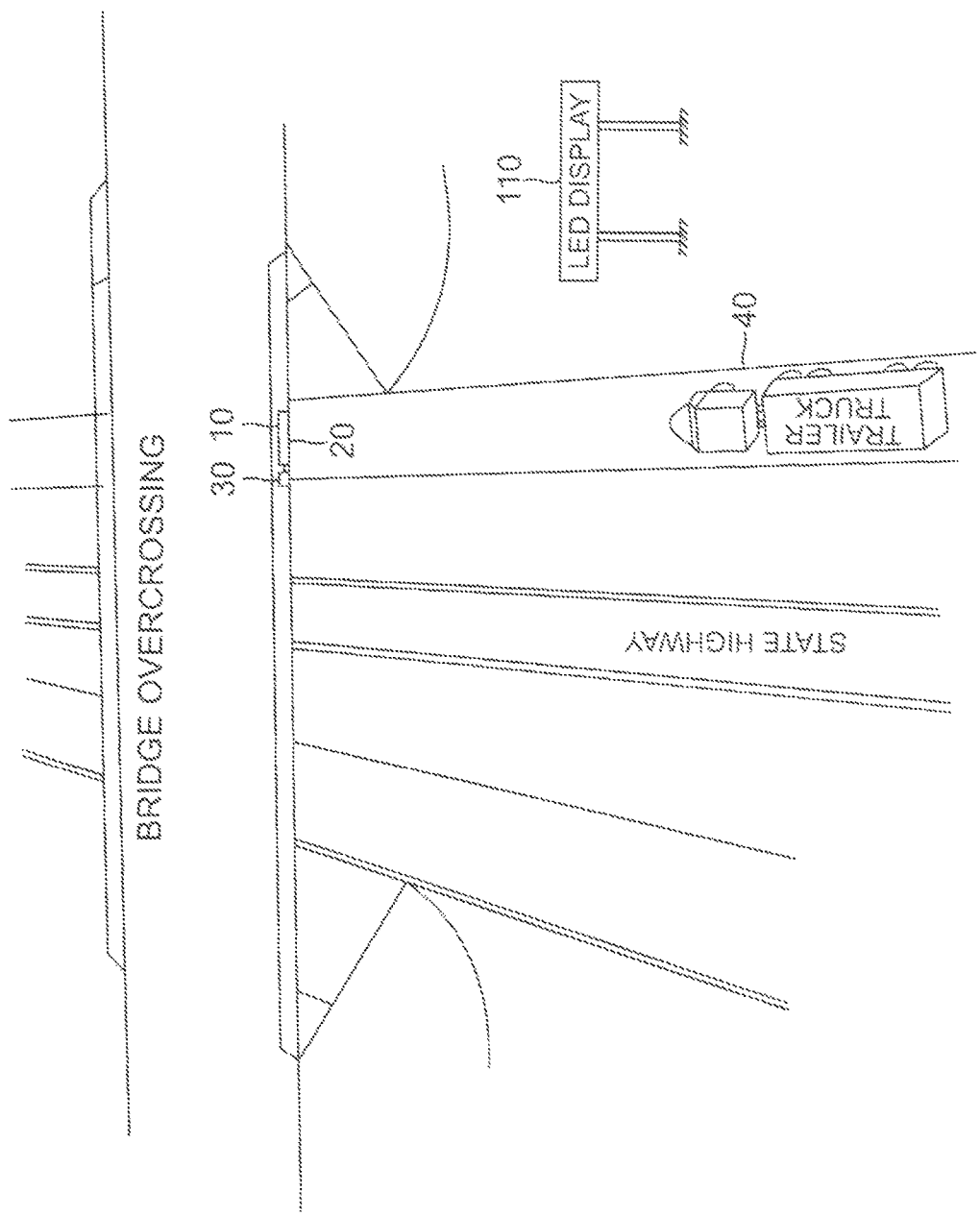
FIG. 1 shows a bridge with a clearance height measurement system and associated displays.

The present invention relates to a system and method for measuring and communicating the clearance height of a bridge in real time. In one embodiment, a measuring device is mounted on a bridge 10. The device measures the distance from the point at which it is mounted on the bridge to the driving surface 20 below. The measurement is processed (e.g. to take into account factors such as where on the bridge the device is mounted, any protrusions that may be extending downwardly from the bridge, or the like), then displayed, on a display 30 so that a driver 40 approaching the bridge can see the current height of the bridge.

The display may be in the form of a light sign using LED's or other lighting devices to post the current clearance in a manner that a driver of an approaching vehicle can see from a distance as the vehicle approaches the bridge. The clearance may be measured and updated continuously, or pre-selected intervals may be chosen for re-measuring.

Measuring devices 50 per se are known in the art. They may be laser-based, ultra-sound based, or based on another technology that measures a distance. An interface between the measuring device may include a microprocessor 60 programmed with instructions to process the data from the measuring device and transmit signals to the display 30 for displaying the current clearance height.

In one embodiment, the measuring device is mounted on the bridge in an area corresponding to the least clearance. That is, where the height from the soffit to the roadway is the smallest. Typically, there is a spot with least height, such as at one corner of bridge relative to the roadway below. This critical location will vary from bridge-to-bridge. Sometimes it will be at the approach to the bridge, sometimes at the departure. It is possible, then, that the clearance is measured at the departure, but transmitted to a display facing trucks moving toward the approach. Also, there may be a different clearance height in each direction. So, for example, traffic approaching from one direction may be provided with one clearance height, while traffic approaching from the other direction may be provided with another clearance height. In this model, there is at least one sensor for each traffic direction.

As is known in the art, there are established methods of locating the point of least clearance, at which measuring equipment may be located. One approach is to physically measure the clearance and then position the equipment at a point of least clearance. Another is to use the cross slope and vertical profile of the roadway and bridge to estimate exact spot. Reference may be made to the as-built plans for the bridge and roadway and measurements taken at time of design, construction and/or other time.

The foregoing merely illustrates one embodiment of the invention. Various details and alternatives may be implemented. For example, more than one measurement device may be utilized in each traffic direction, to take into account the possibility that the clearance varies at different points under the width of the bridge. So, for example, one measuring device may be mounted at the front of the bridge, another device at the rear, and/or at other locations on the bridge. The microprocessor would then select the least clearance from among the sensors and display the least clearance to oncoming traffic. As another alternative, the system may report current clearance to a server or otherwise, so that clearance may be monitored remotely. Current clearances from several bridges may be reported, and current clearance data displayed on a map and/or incorporated into route planning applications, and displayed on a route planning display 100 (FIG. 3).

Figure 3:
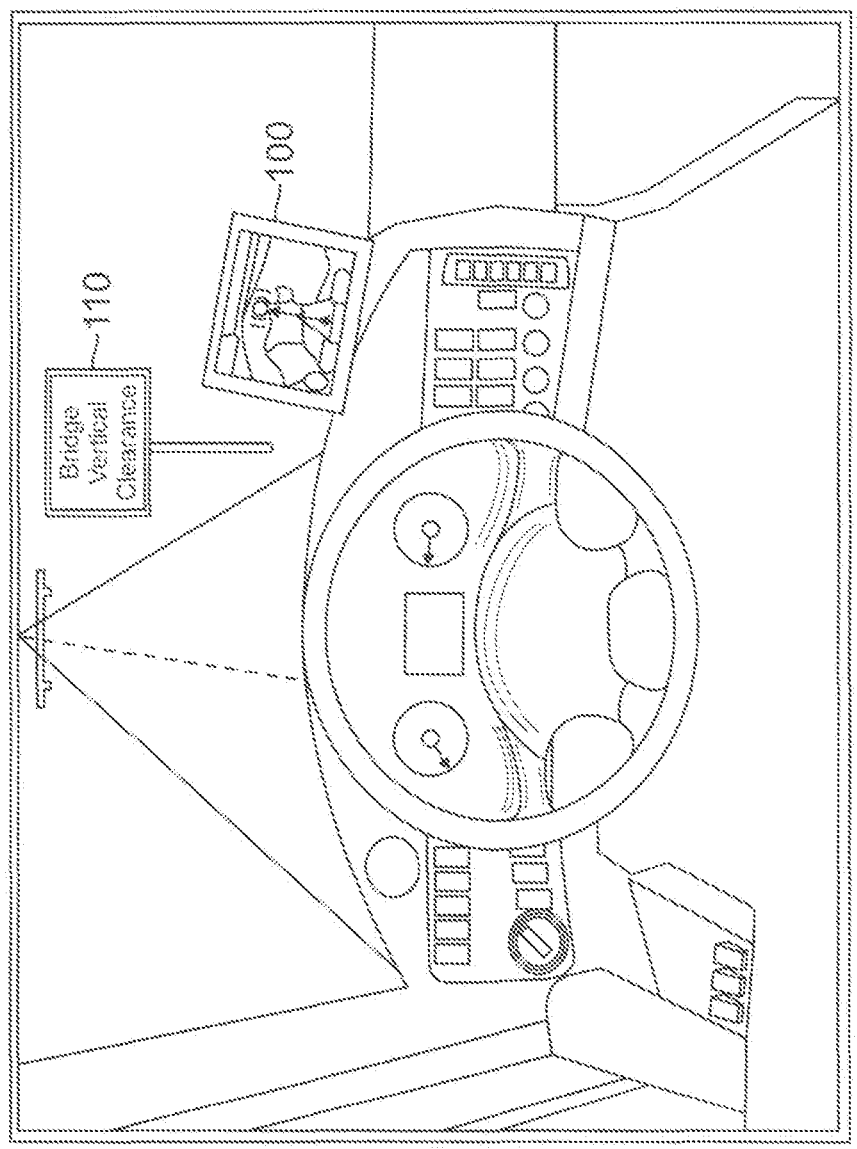
FIG. 3 presents a vehicle in which is mounted a display for displaying bridge height clearance.

In another embodiment, the measured bridge clearance data is received by oncoming trucks, such as for example in conjunction with a GPS device with mapping software and a display 100 (FIG. 3). Bridge height data can be incorporated into route planning routines to divert a truck's route away from bridges with insufficient clearance, and/or to sound a warning when the track approaches a bridge with insufficient clearance. Alternatively, the display 100 may display the bridge height and/or other information Important to the driver. The display 100 may be of any of different varieties, such as mounted in the dash, on the dashboard, or otherwise.

Figure 2:
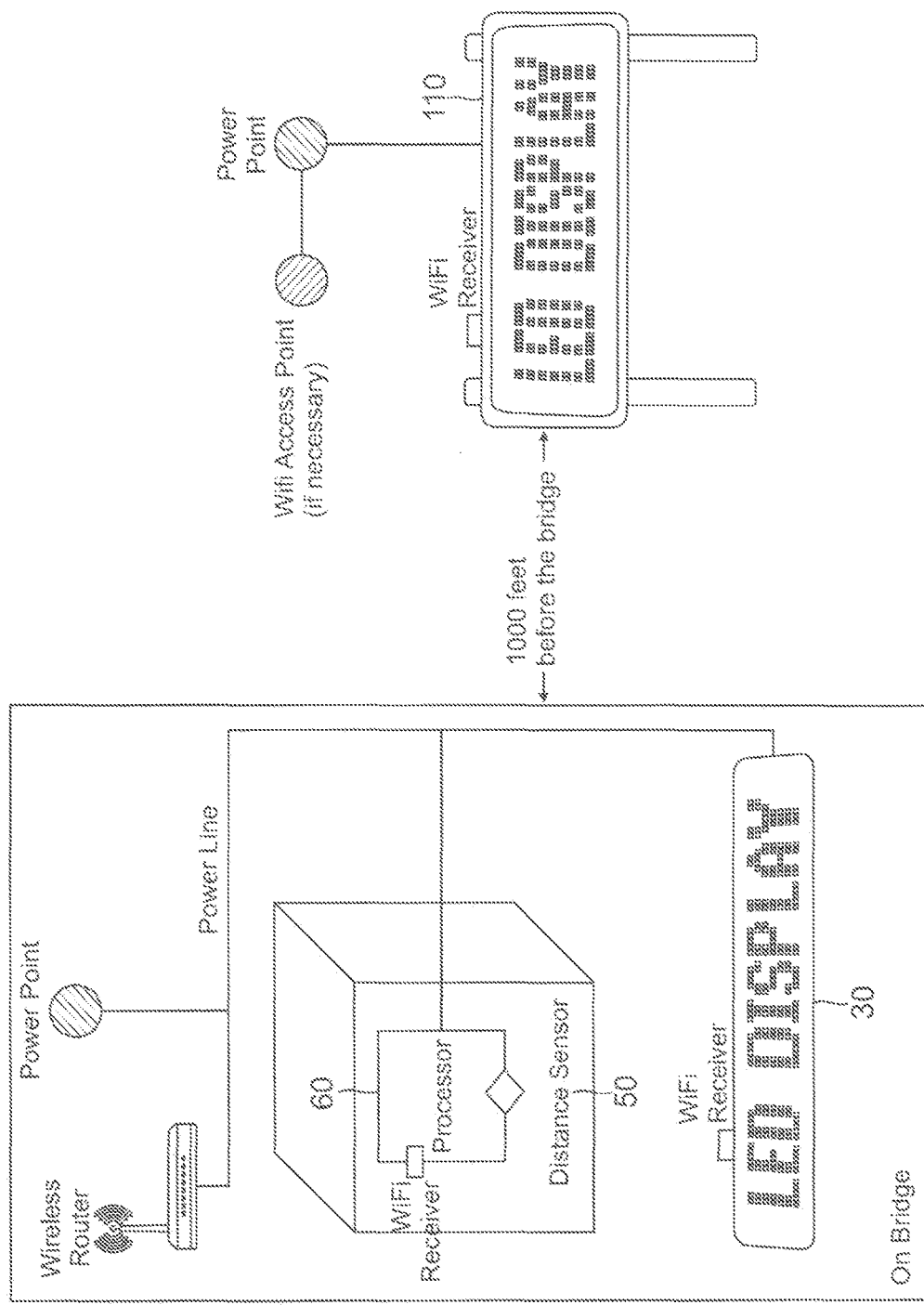
FIG. 2 illustrates details of the clearance height measurement system and associated displays.

In another embodiment, one or more displays 110 (FIGS. 1, 2) visible to a track driver are located along the roadway leading up to the bridge. The system may transmit the bridge height clearance to the one or more displays along the roadway leading to the bridge. As one non-limiting example, a display visible to the truck driver may be placed beginning 1000 feet prior to the bridge, or another distance selected as appropriate for the roadway. This provides the driver with advance notice of the bridge height, so that the driver has time to stop the truck well un advance of reaching the bridge. Information to be displayed on displays may be communicated many different ways, such as via a wireless router, hard wiring, cellular or radio communication, via a computer network, or other known means for communicating information to a display.

While the invention has been described in its preferred embodiments, it is to be understood that the words which have been used are words of description and not of limitation. As such, the invention is not limited by the foregoing specific examples.

What is claimed is:

1. A method for warning of bridge height clearance with a system comprising multiple measuring devices mounted on a bridge, a processor and a display, the method comprising:

mounting multiple measuring devices at different points of a bridge that extends over a roadway and that has clearance heights that vary at different points of the bridge;

measuring the respective distances from the points at which the measuring devices are mounted on the bridge to a roadway below to obtain measurement data, the measuring devices comprising one of a light-based and a sound-based measuring system;

processing measurement data from the multiple measuring devices with a computing system that has a microprocessor to calculate a minimum clearance height between the bridge and the roadway below;

displaying a minimum clearance height of the bridge on a lighted display located on or near the bridge so that a driver approaching the bridge can see the current minimum clearance height of the bridge;

transmitting the minimum clearance height over a computer network to a plurality of vehicles and displaying the clearance height on respective displays within the vehicles; and determining with a computing system that includes a microprocessor a preferred driving route for at least one of the vehicles based on the minimum clearance height of the bridge and on a minimum clearance height of at least one other bridge, to assist a driver in choosing a route.

2. The method of claim 1 wherein the step of processing the measurement data comprises adjusting the displayed clearance height of the bridge to account for special conditions.

3. The method of claim 2 wherein the special conditions comprise at least one of the location on the bridge the device is mounted and protrusions that extend from the bridge.

4. The method of claim 1 wherein the step of displaying a clearance height on a lighted display includes displaying the clearance height on an LED display.

5. The method of claim 1 wherein the clearance height is measured and updated continuously.

6. The method of claim 1 wherein the clearance height is measured at pre-selected re-measuring intervals.

7. The method of claim 1 wherein a plurality of displays display a plurality of bridge clearance heights from a plurality of different bridges.

8. The method of claim 1 wherein the system comprises at least two lighted displays located on or near the bridge, one lighted display visible to traffic approaching the bridge from a first direction and a second lighted display visible to traffic approaching the bridge from a second direction, and the step of processing the measurement data to calculate a clearance height of the bridge comprises calculating with a computer having a microprocessor a first clearance height to display to traffic approaching the bridge from the first direction and calculating a second clearance height to display to traffic approaching the bridge from the second direction.

9. The method of claim 1 wherein the system comprises a plurality of lighted displays, and the step of displaying a clearance height comprises displaying the clearance height on a plurality of lighted displays located a distance from the bridge, visible to oncoming traffic and alongside a road leading up to the bridge.

10. A method for warning of bridge height clearance with a system comprising a plurality of measuring devices mounted on a bridge, a processor and a display, the method comprising:

measuring the distance from the points at which the measuring devices are mounted on the bridge to a driving surface below to obtain measurement data;

processing the measurement data with a computer system that includes a microprocessor to calculate at least one clearance height of the bridge;

displaying the clearance height on an LED display located on or near the bridge and that is visible to traffic approaching the bridge;

transmitting the clearance height over a computer network; and displaying the clearance height on a second display located remotely from the bridge in a vehicle.

11. A method as defined in claim 10, wherein the method further comprises the step of determining a preferred route for a particular vehicle based on the clearance height and on the clearance height of at least one other bridge.

12. A method as defined in claim 10, wherein the method further comprises the step of displaying the minimum clearance height on a lighted display located a distance from the bridge and adjacent to a roadway approaching the bridge.

13. A method for warning of bridge height clearance with a system comprising a measuring device mounted on a bridge, a processor and a display, the method comprising:

mounting multiple measuring devices at different points of a bridge that extends over a roadway and that has clearance heights that vary at different points of the bridge;

measuring the respective distances from the points at which the measuring devices are mounted on the bridge to a roadway below to obtain measurement data, the measuring devices comprising one of a light-based and a sound-based measuring system;

processing the measurement data from the multiple measuring devices with a computing system that has a microprocessor to calculate a minimum clearance height between of the bridge and the roadway below;

displaying a minimum clearance height of the bridge on a lighted display located on or near the bridge so that a driver approaching the bridge can see the current minimum clearance height of the bridge;

transmitting the minimum clearance height over a computer network to a plurality of vehicles and displaying the clearance height on respective displays within the vehicles; and determining with a computing system that includes a microprocessor a preferred driving route for at least one of the vehicles based on the minimum clearance height of the bridge and on a minimum clearance height of at least one other bridge, to assist a driver in choosing a route;

wherein two lighted displays are located on or near the bridge, a first lighted display visible to traffic approaching the bridge from a first direction and a second lighted display visible to traffic approaching the bridge from a second direction, the method further comprising the step of calculating with a computer having a microprocessor a first clearance height to display on the first lighted display and a second clearance height to display on the second lighted display.

\* \* \* \* \*